(12) United States Patent
Yersak et al.

(10) Patent No.: US 10,734,673 B2
(45) Date of Patent: Aug. 4, 2020

(54) IONICALLY-CONDUCTIVE REINFORCED GLASS CERAMIC SEPARATORS/SOLID ELECTROLYTES

(71) Applicant: GM GLOBAL TECHNOLOGY OPERATIONS LLC, Detroit, MI (US)

(72) Inventors: Thomas A. Yersak, Ferndale, MI (US); James R. Salvador, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 15/631,261

(22) Filed: Jun. 23, 2017

(65) Prior Publication Data

US 2018/0375148 A1    Dec. 27, 2018

(51) Int. Cl.
*H01M 10/0562* (2010.01)
*C03C 3/32* (2006.01)
(Continued)

(52) U.S. Cl.
CPC .......... *H01M 10/0562* (2013.01); *C03C 3/16* (2013.01); *C03C 3/32* (2013.01); *C03C 3/321* (2013.01); *C03C 4/14* (2013.01); *C03C 8/02* (2013.01); *C03C 14/002* (2013.01); *H01M 2/145* (2013.01); *H01M 2/1606* (2013.01); *H01M 10/052* (2013.01); *H01M 10/054* (2013.01);
(Continued)

(58) Field of Classification Search
CPC ........ H01M 10/0562; C03C 3/32; C03C 4/14
See application file for complete search history.

(56) References Cited

U.S. PATENT DOCUMENTS 5,415,959 A * 5/1995 Pyszczek .............. H01M 2/162
                                                    139/420 A
7,855,017 B1 * 12/2010 Snyder .............. H01M 10/0565
                                                    429/232
(Continued)

OTHER PUBLICATIONS

U.S. Appl. No. 15/480,505; Sulfide and Oxy-Sulfide Glass and Glass-Ceramic Films for Batteries Incorporating Metallic Anodes; filed Apr. 6, 2017.
(Continued)

*Primary Examiner* — Karie O'Neill Apicella
(74) *Attorney, Agent, or Firm* — Reising Ethington P.C.

(57) ABSTRACT

Fiber-reinforced separators/solid electrolytes suitable for use in a cell employing an anode comprising an alkali metal are disclosed. Such fiber-reinforced separators/solid electrolytes may be at least partially amorphous and prepared by compacting, at elevated temperatures, powders of an ion-conducting composition appropriate to the anode alkali metal. The separators/solid electrolytes may employ discrete high aspect ratio fibers and fiber mats or plate-like mineral particles to reinforce the separator solid electrolyte. The reinforcing fibers may be inorganic, such as silica-based glass, or organic, such as a thermoplastic. In the case of thermoplastic fiber-reinforced separators/solid electrolytes, any of a wide range of thermoplastic compositions may be selected provided the glass transition temperature of the polymer reinforcement composition is selected to be higher than the glass transition temperature of the amorphous portion of the separator/solid electrolyte.

15 Claims, 5 Drawing Sheets

(51) Int. Cl.
  *C03C 4/14*      (2006.01)
  *C03C 3/16*      (2006.01)
  *C03C 8/02*      (2006.01)
  *C03C 14/00*     (2006.01)
  *H01M 10/054*    (2010.01)
  *H01M 10/052*    (2010.01)
  *H01M 2/14*      (2006.01)
  *H01M 2/16*      (2006.01)
  *C03C 3/091*     (2006.01)

(52) U.S. Cl.
  CPC .......... *C03C 3/091* (2013.01); *C03C 2214/02* (2013.01); *H01M 2/1613* (2013.01); *H01M 2300/0068* (2013.01); *H01M 2300/0088* (2013.01)

(56) References Cited

U.S. PATENT DOCUMENTS

2015/0064537 A1\* 3/2015 Christensen ...... H01M 10/0562
                                                    429/126
2018/0309166 A1\* 10/2018 Yersak ................ H01M 10/052

OTHER PUBLICATIONS

U.S. Appl. No. 15/493,496; High Energy Density Alkali Metal Batteries Incorporating Solid Electrolytes; filed Apr. 21, 2017.
U.S. Appl. No. 15/494,745; Passivation of Sulfide, Oxide, and Oxysulfide Glass Electrolyte Films for Lithium Metal Batteries; filed Apr. 24, 2017.

\* cited by examiner

FIG. 9

IONICALLY-CONDUCTIVE REINFORCED GLASS CERAMIC SEPARATORS/SOLID ELECTROLYTES

TECHNICAL FIELD

Methods are provided for preparing fiber-reinforced separators/solid electrolytes suitable for use in high output, long life batteries which employ anodes comprising lithium or sodium, the fiber-reinforced solid electrolyte being suitably composed to conduct lithium or sodium ions as appropriate.

INTRODUCTION

Batteries based on a lithium chemistry are increasingly dominant in applications requiring high energy density such as automotive vehicles and many other consumer products such as phones and cameras. Most lithium chemistry batteries in current use intercalate lithium into a suitable receptor/donor material capable of receiving and accepting lithium ions during battery charge and discharge cycles. The electrodes are spaced apart and separated by a porous polymeric film separator, and immersed in an organic, lithium ion-conducting liquid electrolyte. In addition to high energy densities, such lithium ion batteries lose a minimal amount of charge when not in use, and do not exhibit memory effects.

But the energy density of existing rechargeable batteries may be further improved through the use of metallic lithium electrodes. However, lithium metal may react with and consume the liquid electrolytes commonly-used in lithium ion batteries, resulting in a progressive reduction in cell capacity over multiple charge-discharge cycles. This lithium reactivity has led to the development of solid state electrolytes, such as sulfide or oxy-sulfide glass compositions which both conduct lithium ions and serve to physically and electrically isolate the anode and cathode. Thus, such solid state electrolytes combine both the electrolyte and separator functions found in liquid electrolyte cell structures.

An issue with electrochemical cells or batteries employing lithium is that the lithium may be non-uniformly deposited during battery recharging leading to the formation of lithium dendrites, elongated, tree-like structures which extend outwardly from the anode. A dendrite, once formed, may continue to grow on subsequent recharge cycles and eventually grow long enough to bridge the gap between the cell anode and cathode, promoting an internal electrical short circuit and resulting in premature cell failure. Of course, the dendrite, in growing to length suitable for creating a short circuit, must penetrate the separator/electrolyte positioned between and at least coextensive with the cell anode and cathode, so that one important characteristic of any separator is its ability to resist infiltration or penetration by dendrites.

While cells employing solid state electrolytes may be more effective in suppressing lithium dendrite penetration than the cells which employ liquid electrolytes with polymeric separators there is a continuing need for improved battery separators with increased resistance to lithium penetration.

SUMMARY

This disclosure relates to an aspect of improving durability of electrochemical cells used in rechargeable secondary batteries, particularly cells which employ metallic lithium or metallic sodium as an electrode and a solid, glassy, electrolyte. The solid, glassy electrolyte, in the form of a thin, typically, less than 200 micrometers, sheet with opposing faces, is placed between the metallic anode and a suitable cathode. The opposing sheet faces are co-extensive with the anode and cathode and the opposing faces are brought into contact with an opposing anode and cathode pair to form an electrochemical cell. The solid glassy electrolyte serves as both as an ionic conductor (for lithium or sodium ions as appropriate to the anode chemistry) and as a separator, preventing direct electrical contact between the anode and cathode. For convenience, such a solid, glassy electrolyte will be referred to as a separator/solid electrolyte in subsequent sections.

Such cells may employ 20 micrometer thick lithium anode and an NMC (Lithium Nickel Manganese Cobalt Oxide ($LiNi_xMn_yCo_zO_2$ where, generally, x+y+z=1)) or an elemental sulfur cathode. The disclosure is directed to a method improving the resistance of the glassy or amorphous solid state separator/electrolyte to dendrite penetration without prejudicing the cell electrical performance. These goals may be achieved by reinforcing the separator/solid electrolyte with fibers at a concentration sufficient to improve the fracture toughness of the separator/solid electrolyte but insufficient to significantly degrade the electrical conductivity of the fiber-reinforced separator/solid electrolyte relative to an un-reinforced separator/solid electrolyte of like chemistry. As used in lithium batteries, many suitable separator/solid electrolyte may be sulfides or oxy-sulfides but other chemical combinations, including complex hydride compositions such as $LiBH_4 \cdot LiNH_2$, which forms an ion-conducting crystalline or ceramic phase may be suitable. Analogous sodium-containing and sodium ion-conducting compositions may be suitable for sodium anode cells.

Suitable lithium ion-conducting sulfide or oxy-sulfide based glassy separators for lithium batteries may adopt a broad range of compositions and may be formed by combining three classes of materials: i) one or more glass formers, including, for example, $P_2S_5$, $SiS_2$, $GeS_2$, $SnS_2$, $B_2S_3$, $P_2O_5$, $B_2O_3$, $SiO_2$; ii) one or more glass modifiers, including, for example, $Li_2S$, $Li_2O$, and; iii) one or more dopants, for improving glass formability and/or stability, including, for example, LiI, $Li_3PO_4$, $Li_4SiO_4$. It will be understood that the compositions associated with particular material classes are exemplary and neither limiting nor exclusionary.

For a sulfide glass both the glass former and the glass modifier will contain sulfur (e.g. $Li_2S$—$P_2S_5$). An oxy-sulfide glass may combine an oxide-forming system with a sulfide co-former (for example, and without limitation $Li_2O$—$P_2O_5$—$P_2S_5$) or a sulfide-forming system with an oxide co-former (for example, and without limitation $Li_2S$—$P_2S_5$—$P_2O_5$). Further details and analogous sodium ion-conducting compositions may be found in co-pending U.S. application Ser. No. 15/480,505, filed Apr. 6, 2017 and entitled "SULFIDE AND OXY-SULFIDE GLASS AND GLASS-CERAMIC FILMS FOR BATTERIES INCORPORATING METALLIC ANODES" which is hereby incorporated by reference.

Recently alternate ion-conducting compositions of $Li_3OM_{1-x}(OH)_x$ or $Na_3OMi_{1-x}(OH)_x$ (M=Cl, Br) have been developed. Although these compositions, when fabricated as amorphous solids, have a glass transition temperature of 41° C. and so may be less susceptible to the issues discussed below in connection with sulfide and oxy-sulfide separator/solid electrolyte compositions, these halide-containing compositions may also benefit from the practices described in the remainder of this paper.

Sulfide and oxy-sulfide separator/solid electrolyte compositions have glass transition temperatures which are about 150-250° C. above a cell or battery operating temperature. Thus, these glasses, during battery fabrication and operation at temperatures close to room temperature or about 20-25° C., may exhibit relatively low fracture toughness, that is, rather than exhibit plastic flow they are prone to crack and fracture when loaded. Typically, fracture initiates at pre-existing flaws, located either internal to the solid-state electrolyte or on the electrolyte surface. Such internal flaws may include internal voids resulting, for example, from incomplete sintering of powder precursors, while surface flaws may include scratches, nick or chips. Under application of a suitable load, these flaws may initiate a crack which, as the load is maintained, extends and propagates through the separator/solid electrolyte, fracturing the separator/solid electrolyte and creating an opening through which a dendrite can pass. Obviously, the ability of such a fractured separator/solid electrolyte to resist dendrite penetration is severely compromised.

But, if these sulfide and oxy-sulfide separator/solid electrolyte compositions are reinforced with fibers, the ability of the crack to propagate is limited. Typically, in a fiber-reinforced separator/solid electrolyte structure, a crack will stop propagating when it encounters a reinforcing fiber. Thus, incorporating reinforcing fibers in the separator/solid electrolyte is effective in warding off the tendency of a crack to propagate through the entire thickness of the electrolyte and so inhibits complete fracture of the electrolyte. In such a fiber-reinforced separator/solid electrolyte the ion-conducting glass composition is the continuous phase with fibers dispersed in the glass composition. Suitably the fibers may be introduced as discrete, dispersed, individual, high-aspect fibers or the fibers may be assembled into a temporary structure or scaffold or mat to ensure a more uniform distribution of the fibers throughout the separator/electrolyte. Such a mat may comprise overlaying, loosely woven sheets or unwoven structures incorporating crisscrossing fibers of varying orientations which may be secured together, for example, by needle-punching, melt blowing, or hydroentanglement (sometimes called spunlacing). Alternatively, the unwoven mat fibers may be secured to one another with a binder provided such a binder is compatible with the separator processing scheme described later. Suitably the thickness of a mat, woven or un-woven, will incorporate no more than six to eight fiber thicknesses, both to ensure that it may be accommodated within the thickness of the formed separator/electrolyte which may be less than 100 micrometers thick and to minimize the resulting reduction in ionic conductivity of the separator/solid electrolyte. The fibers may be circular in cross-section with diameters of between 500 nanometers and 20 micrometers and be up to 2000 micrometers in length if discrete fibers. Often the fibers which comprise an unwoven fiber mat are continuous.

A broad range of fiber compositions may be employed. Because the fibers may be arranged in an interconnected network which, when assembled into a cell, may extend from the anode to the cathode, the reinforcing fibers should be electrical insulators. Examples include silica-based glass fibers, alumina fibers, and boron nitride fibers. Other high aspect reinforcements may have a more particulate character, and may, for example exhibit a plate-like geometry. Such reinforcements may be incorporated into the separator/solid electrolyte as a plurality of generally uniformly-distributed particles. Examples may include naturally exfoliated clays such as, for example, montmorillonite, among other mineral fillers, such as mica.

Thermoplastic polymers, in fiber form, may also be used provided they do not undergo significant deformation or creep during the electrolyte processing described in later sections. Suitably, any selected thermoplastic polymer should exhibit a glass transition temperature about 10° C., or more, greater than the glass transition temperature of the separator/solid electrolyte composition. For some separator/solid electrolyte compositions which are processed at temperatures of 180-220° C. this may require employing thermoplastics with elevated glass transition temperatures such as imides and amides. Generally, the appropriate choice of thermoplastic fiber(s) will depend on the composition of the solid electrolyte.

By way of example, and without limitation, a higher glass transition temperature separator composition such as $70Li_2S.30P_2S_5$ (molar proportions) with a glass transition temperature of about 220° C. may employ aramid fibers such as Kevlar® and Nomex® which have glass transition temperatures of greater than 300° C. or imides, for example PEI with a glass transition temperature of about 230° C. Lower glass transition temperature separator/solid electrolyte compositions will enable the use of reinforcing fiber compositions with a lower glass transition temperature. Such thermoplastic fibers may enable production of thin electrolyte films by powder processing. A blend of fibers and particles of the solid state electrolyte composition may be mixed, compacted, and co-sintered under pressure at a temperature above the glass transition temperature of the electrolyte, but below the glass transition temperature of the reinforcement material to prepare a separator/solid electrolyte layer less than 200 micrometers thick and preferably less than 100 micrometers thick.

By limiting the fraction of the fiber to below about 40 weight percent, an electrolyte structure which maintains the continuity of the ion-conducting glassy electrolyte may be prepared. Such a structure is beneficial in limiting the loss in ionic conductivity resulting from the introduction of the electrically and ionically non-conducting reinforcements. The exemplary reinforcement materials exhibit a range of densities, with some, particularly the inorganic materials having a greater density than the ion-conducting composition, while other reinforcements, particularly the thermoplastic compositions, may have a density less than that of the ion-conducting composition. Suitable percentages by weight to achieve a volume fraction which renders the ion-conducting composition continuous will thus vary with choice of reinforcing material. For example, in an embodiment, an electrolyte composition of $70Li_2S.30P_2S_5$ incorporating 10 wt. % Kevlar demonstrated an electrical conductivity of 2.4 mS/cm versus an electrical conductivity of 4.03 mS/cm for $70Li_2S.30P_2S_5$ alone. Such a fiber-reinforced separator/solid electrolyte, at a thickness of about 100 micrometers or less, is suitable for use in an electrochemical cell and has an ionic conductivity comparable to the separators employed in liquid electrolyte, lithium chemistry, electrochemical cells. Thus, this fiber-reinforced separator/solid electrolyte may also find application in lithium ion 'rocking chair' cells employing, for example, a lithium-intercalated graphite electrode, provided sufficient pressure is applied to enable good electrical and ionic conductivity at the intercalated graphite anode-separator/solid electrolyte interface. Sodium ion batteries may analogously employ sodium-intercalated graphite as the anode.

Methods of fabricating such fiber-reinforced separators/solid electrolytes by sintering of powders of the appropriate separator/solid electrolyte composition are described.

DESCRIPTION OF PREFERRED EMBODIMENTS

Batteries employing cells which employ lithium metal anodes have great potential in applications where high energy density batteries offer performance improvements. Such applications may include, for example, transportation applications such as in electric or hybrid automobiles and trucks, and consumer electronics applications such as in computers and phones.

Lithium anode batteries, and alkali metal anode batteries generally, typically employ solid electrolytes in the form of a thin sheet. Such solid electrolytes may also serve as a separator, maintaining electrical isolation between the metallic lithium cell anode and, in an embodiment, an NMC (Lithium Nickel Manganese Cobalt Oxide, ($LiNi_xMn_yCo_zO_2$ where, generally, x+y+z=1)) cathode, while also inhibiting dendritic shorting of cell and thereby inhibiting overheating or thermal runaway of the cell. Exemplary separator/solid electrolyte compositions may include a sulfide or oxysulfide glass or a complex hydride ceramic.

Suitable sulfide or oxy-sulfide based glassy separator/solid electrolytes for lithium batteries may adopt a broad range of lithium-containing compositions and may be formed by combining three classes of materials: i) one or more glass formers, including, for example, $P_2S_5$, $SiS_2$, $GeS_2$, $SnS_2$, $B_2S_3$, $P_2O_5$, $B_2O_3$, $SiO_2$; ii) one or more glass modifiers, including, for example, $Li_2S$, $Li_2O$, and; iii) one or more dopants, for improving glass formability and/or stability, including, for example, LiI, $Li_3PO_4$, $Li_4SiO_4$. It will be understood that the compositions associated with particular material classes are exemplary and neither limiting nor exclusionary. For a sulfide glass both the glass former and the glass modifier will contain sulfur (e.g. $Li_2S$—$P_2S_5$). An oxy-sulfide glass may combine an oxide-forming system with a sulfide co-former (for example, and without limitation $Li_2O$—$P_2O_5$—$P_2S_5$) or a sulfide-forming system with an oxide co-former (for example, and without limitation $Li_2S$—$P_2S_5$—$P_2O_5$). The resulting glass can provide mobile lithium cations associated with anions that are generally fixed in the molecular structure. Analogous sodium ion-conducting compositions based on sodium-containing constituents may be prepared and may be appropriate for cells employing a metallic sodium anode.

Glasses, including the above ion-conducting glasses, will exhibit a glass transition temperature at which the material will transition from a flowable viscous liquid to a relatively hard and generally brittle solid. Beneficially, the glass compositions targeted for use in lithium or sodium metal cells and batteries may be prepared, among other approaches, by sintering of a prepared powder of the appropriate composition. Sintering is conducted at a temperature above the glass transition temperature and the resulting separator/solid electrolyte is employed, in an electrochemical cell, at a temperature less than the glass transition temperature. Thus, in use, the separator/solid electrolyte is in its 'hard, generally brittle' state and so can physically resist the growth of dendrites and inhibit the development of internal short circuits.

However, the 'hard, generally brittle' character of the separator/solid electrolyte, or stated alternatively, the low fracture toughness of the separator/solid electrolyte, may render the separator/solid electrolyte susceptible to damage resulting from the application of internally-generated and externally-generated loads, both during cell and battery fabrication and in use. In low fracture toughness materials with pre-existing flaws, application of a suitable load may generate a crack, and on continued load application the crack may propagate sufficiently to fracture the material. Pre-existing flaws may be present in a separator/solid electrolyte prepared by sintering and may include, for example, internal voids resulting, for example, from incomplete sintering, and surface flaws including scratches, nick or chips. Obviously, if such pre-existing flaws result in fracture of the separator/solid electrolyte under load, its ability to suppress dendrite growth will be severely compromised.

The fracture toughness of a separator/solid electrolyte may be enhanced by forming a two-phase separator/solid electrolyte by adding a reinforcement to an sulfide/oxy-sulfide separator/solid electrolyte composition. The reinforcement may be fibrous and should be present in proportion sufficient to achieve a desired increase in fracture toughness without significantly compromising the ionic conductivity of the separator/solid electrolyte while also maintaining the composite's resistance to electrical conduction. More particularly, the reinforcement should only be added in a quantity sufficient to assure that the ion-conducting glass or crystalline phase is continuous.

If the reinforcing fiber composition is a thermoplastic polymer, the choice of appropriate polymer is informed by the glass transition temperature of the separator/solid electrolyte composition. As described above, suitable separator/solid electrolytes may be prepared by sintering appropriate sulfide/oxy-sulfide powders under pressure at a temperature above the glass transition temperature of the selected sulfide/oxy-sulfide composition. To prepare a fiber-reinforced separator/solid electrolyte the precursor sulfide/oxy-sulfide powders may be mixed with a suitable quantity of reinforcing fibers and the sulfide/oxy-sulfide/fiber blend sintered under pressure at the same temperature as the unmixed sulfide/oxy-sulfide powder. Thus, a selected fiber reinforcement should be physically and chemically stable at the sintering temperature to assure that on cooling to about room temperature or 20-25° C. the fiber retains its integrity and continues to exhibit its reinforcing properties.

One suitable class of fibers with reinforcing properties is thermoplastic polymers. Such polymers also exhibit a glass transition temperature and generally soften before decomposing so the choice of thermoplastic polymer should be based on a comparison of the respective glass transition temperatures of the selected sulfide/oxy-sulfide and the reinforcing polymer. For many sulfide/oxy-sulfide glass compositions such as those based on $Li_2S$—$P_2S_5$ and $Li_2S$—$P_2S_5$—$P_2O_5$, the glass transition temperature is in the range of 180-220° C. so that only high glass transition temperature thermoplastics are suitable. As an example, and without limitation, a glass of $70Li_2S.30P_2S_5$ composition has a glass transition temperature of about 220° C. requiring high glass temperature thermoplastics such as aramid fibers, for example, Kevlar® and Nomex® which have glass transition temperatures of greater than 300° C., or imides, for example, polyethylenimine with a glass transition temperature of about 230° C. Note however, that compositions of the $Li_2S$—$P_2S_5$—$SiS_2$ system may exhibit a glass transition temperature above 300° C. potentially requiring the use of silica-based glass or other suitable high temperature filler materials for reinforcement.

By contrast, if an alternative separator/solid electrolyte composition such as crystalline $LiBH_4.LiNH_2$ could be used, its appreciably lower melt temperature of about 100° C. would enable the use of a broad range of reinforcing fiber compositions. These fiber compositions may include (approximate glass transition temperatures or temperature ranges in parenthesis): polystyrene (90-105° C.), polymethylmethacrylate (105-115° C.), polytetrafluoroethylene (125-130° C.), polyamide 6-3-T (149-153° C.), polyetheretherketone (145° C.), (polyetherketoneetherketoneketone (165-175° C.), and p-hydroxybenzoic acid/2hydroxy-6-naphathoic acid liquid crystal polymer (127° C.).

Thus, the selected suitable separator/solid electrolyte composition will determine, and limit, the range of suitable thermoplastic fiber reinforcements. In general, it is preferred that the glass transition temperature of the fiber be at least 10° C. greater than the glass transition temperature of the separator/solid electrolyte composition.

In an embodiment, the fibers may be introduced into the separator/solid electrolyte composition powder as discrete, chopped fibers or as a two-dimensional mat. The mat may be unwoven and incorporate crisscrossed, randomly oriented, overlapping fibers secured, for example, by needle-punching, melt blowing, hydroentanglement, or by using a binder compatible with the separator composition. Suitable fibers may be generally circular in cross-section and between about 500 nm and 20 micrometers in diameter, the lower bound resulting from a dramatic fall-off in ionic conductivity of the separator/solid electrolyte at smaller fiber diameters and the upper bound being imposed by the thinness of the separator/solid electrolyte. Chopped fibers and fiber pulp may be up to 2000 micrometers in length. A mat may also be fabricated of woven fibers. As discussed further later, the fabricated separator/solid electrolyte may be less than 100 micrometers in thickness and contain up to about 40% by weight of fiber, so that, fibers in a two-dimensional mat should be stacked no more than about 6-8 deep so that the overall height of the mat is comfortably less than 200 micrometers.

Figure 1:
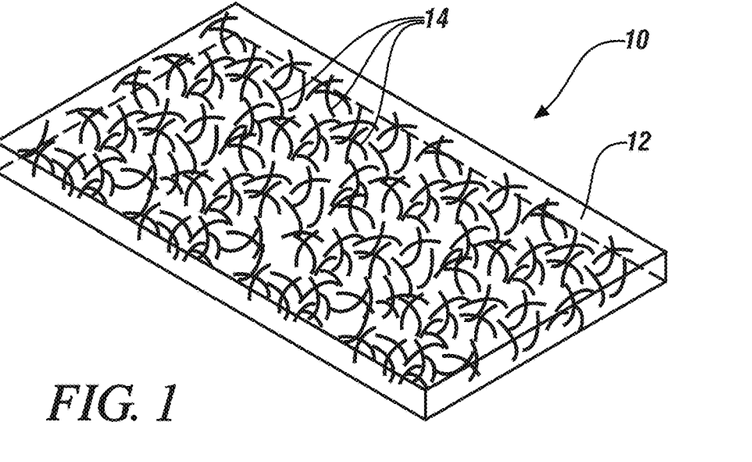
FIG. 1 is a representation of a separator/solid electrolyte, shown in perspective view, incorporating chopped fibers or fiber pulp.
Figure 2:
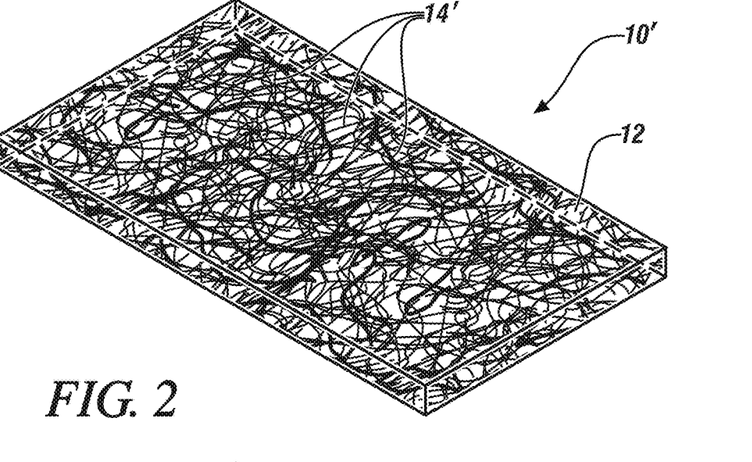
FIG. 2 is a representation of a separator/solid electrolyte, shown in perspective view, incorporating non-woven fibers introduced as a preformed mat.
Figure 3:
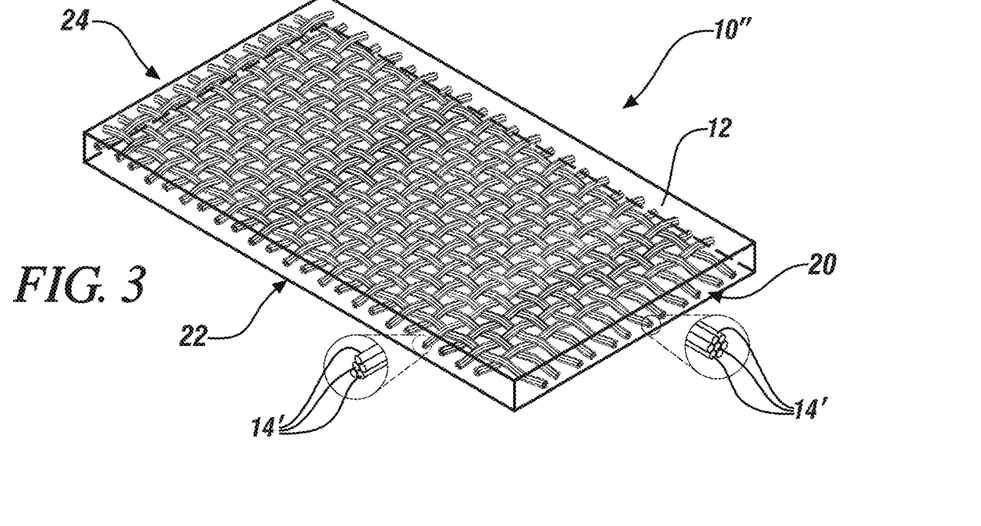
FIG. 3 is a representation of a separator/solid electrolyte, shown in perspective view, incorporating a loosely-woven reinforcement.

These various fiber-separator/solid electrolyte configurations are illustrated in FIGS. 1, 2 and 3. In each figure the separator-solid electrolyte composition is shown as a thin, generally rectangular slab which may not be representative of all separator/solid electrolyte configurations. FIG. 1 schematically illustrates a separator/solid electrolyte 10 containing randomly, and not necessarily uniformly, chopped fibers 14 distributed in a separator/solid electrolyte composition 12. FIG. 2 schematically illustrates a separator/solid electrolyte 10' containing a non-woven mat of overlying and largely randomly oriented fibers 14' distributed in a separator/solid electrolyte composition 12. FIG. 3 is representative of a woven mat separator solid electrolyte 10" in which a woven layer 24 comprising interwoven fiber tows 20 and 22. Each of fiber tows 20 and 22 may incorporate 4-8 fibers 14'. As illustrated, the number of fibers 14' need not be identical in each of tows 20, 22.

Figure 4:
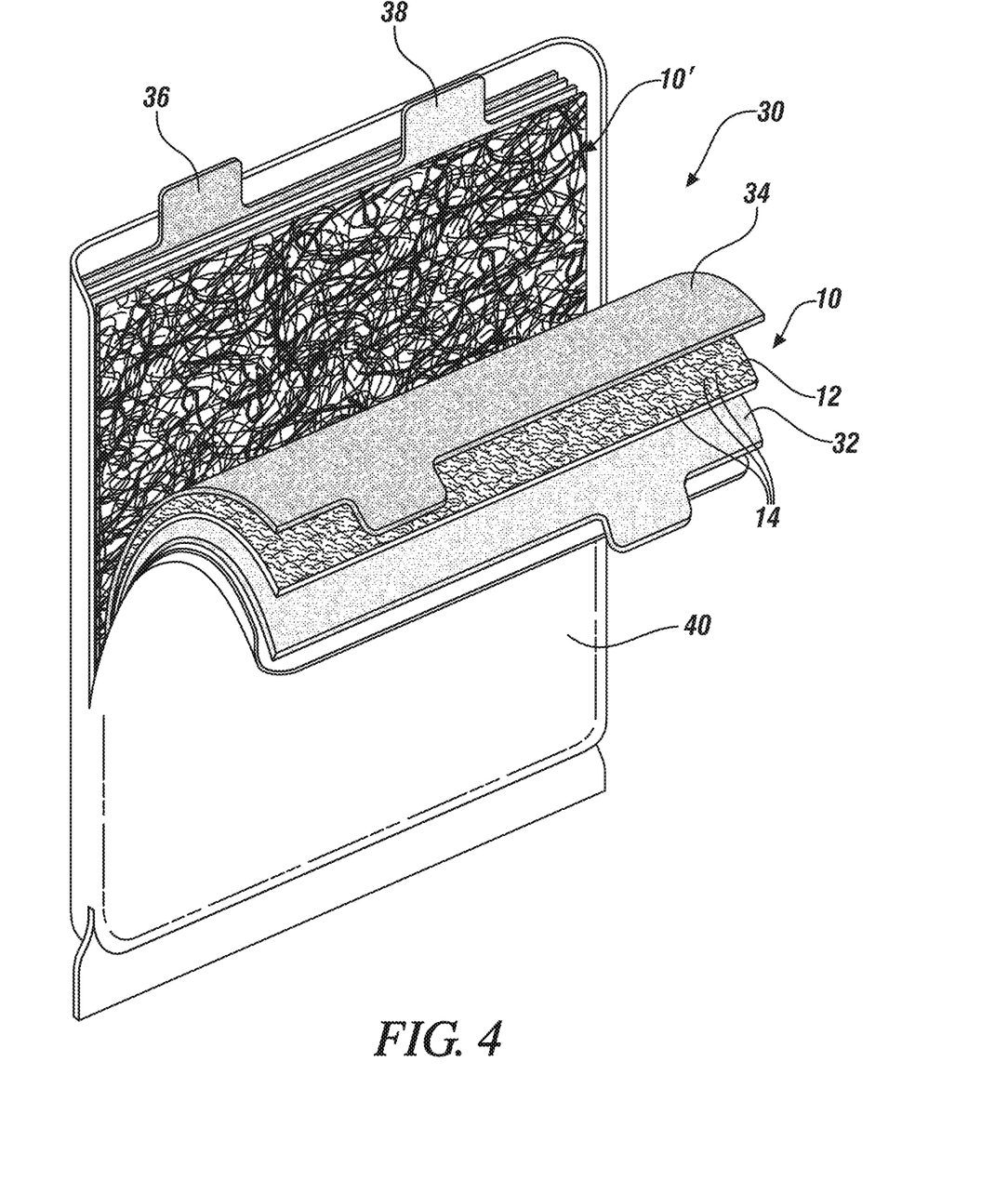
FIG. 4 shows a representation of a battery incorporating a plurality of cells incorporating fiber-reinforced separators/solid electrolytes.

The separator/solid electrolyte configuration shown in FIG. 4 is suitable for use in a prismatic cell or battery 30 such as is shown in FIG. 4. Battery 30, shown peeled apart for ease of illustration, is prismatic and comprises a tabbed alkali metal anode 32, a fiber-reinforced separator/solid electrolyte 10 as shown in FIG. 1, a tabbed cathode 34 then a second fiber-reinforced separator/solid electrolyte 10' as shown in FIG. 2. It will be appreciated that, in general, a single battery may contain only a single separator configuration and that the depiction of both separator 10 and 10' in battery 30 is only to illustrate that any suitable fiber-reinforced separator/solid electrolyte may be used. Connection of the battery to an external circuit may be made through tabs 36 (cathode) and 38 (anode) and in batteries containing a plurality of cells, as for example, battery 30, a plurality of tabs may be interconnected (not shown) internal to the battery case 40. Case 40 may be a soft pouch or a robust solid casing. As an example only, and without limitation, cathode 34 may comprise mixed oxide composition ($LiNi_xMn_yCo_zO_2$ where, generally, x+y+z=1) (NMC). Anode 32 may be a metallic anode consisting of lithium metal with any commonly-occurring impurities. The lithium metal of the anode may be applied mechanically, by thermal evaporation, or may be electrochemically deposited after battery assembly. Such electrochemical deposition may be accomplished by charging the cathode with $LiMO_2$ (where M may be Mn, Co or Ni) then electrochemically plating Li on a copper current collector by oxidizing $LiMO_2$ to $LiMO_2$ to $Li_{1-x}MO_2$. As was noted earlier, similar batteries may be made using sodium metal as the anode and making appropriate adjustments to the cathode and fiber-reinforced separator/solid electrolyte compositions.

A fiber-reinforced separator/solid electrolyte may also be used in a lithium-ion battery provided electrical and ionic conductivity may be enforced at the anode-separator/solid electrolyte interface. Typically, lithium-ion batteries have employed lithium-intercalated graphite electrodes and ensuring appropriate ionic and electrical interfacial conductivity may be achieved by applying sufficient pressure to bring the anode and separator/solid electrolyte into intimate contact. Thus, FIG. 4 may also represent a lithium-ion cell with anode 38 being, for example lithium-intercalated graphite, or other anode composition suitable for use in a lithium-ion cell.

Figure 5:
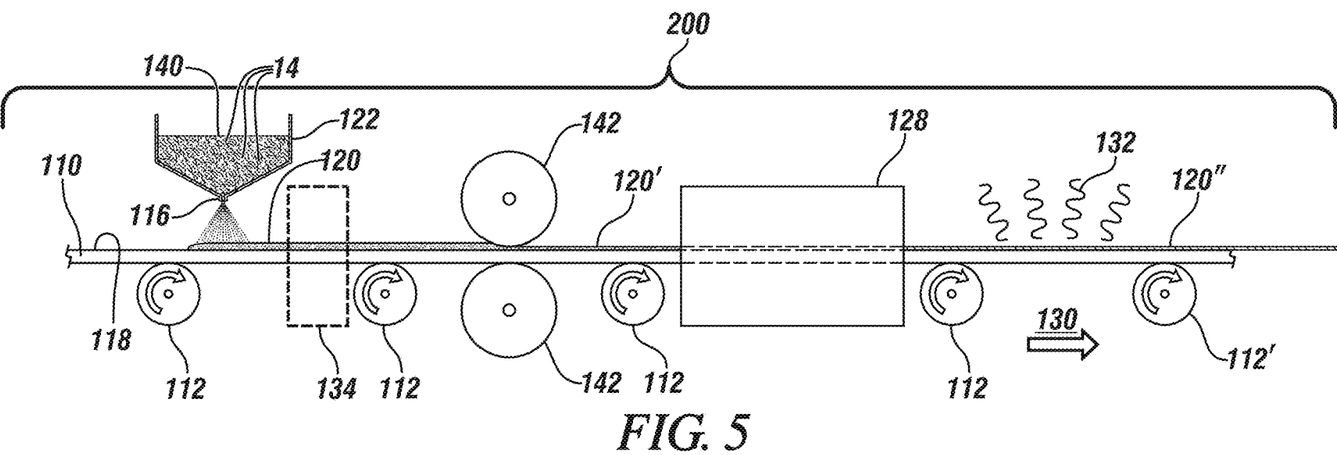
FIG. 5 illustrates a method of forming a separator/solid electrolyte incorporating chopped fibers using a powder of the ion-conducting composition.
Figure 6:
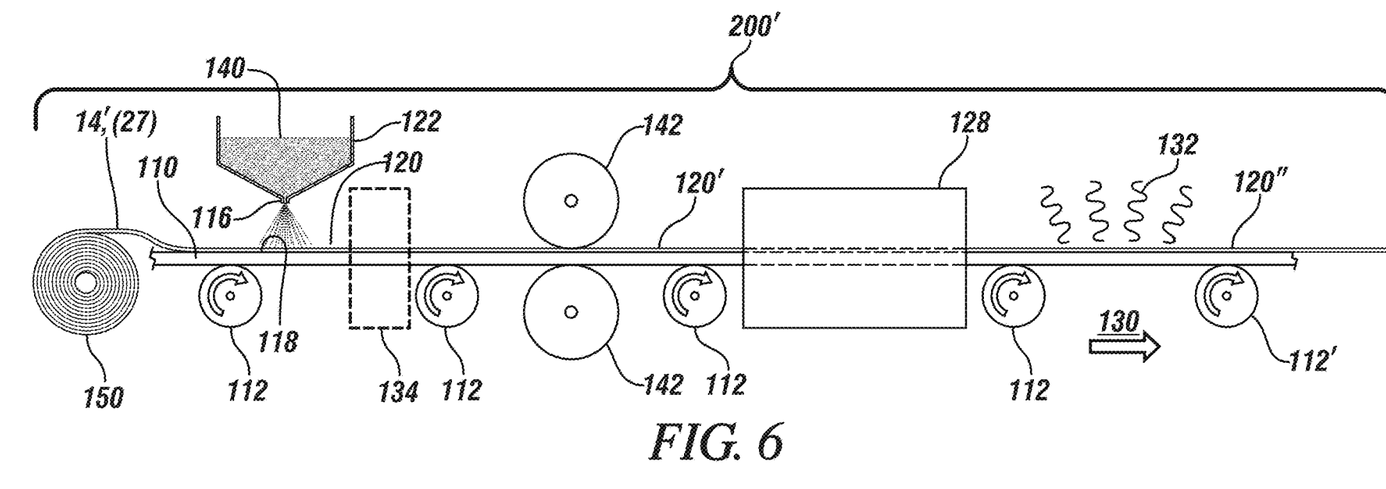
FIG. 6 illustrates a method of forming a separator/solid electrolyte incorporating a preformed mat using a powder of the ion-conducting composition.

Suitable exemplary methods for fabrication of fiber-reinforced thin glassy films suitable for a fiber-reinforced separator/solid electrolyte from a glassy powder precursor are described below in conjunction with FIGS. 5 and 6. FIG. 5 illustrates a process which is suitable for the preparation of fiber-reinforced thin glassy films incorporating chopped fibers or fiber pulp while FIG. 6 illustrates a similar process adapted for use of a mat reinforcement. Both illustrated processes employ, as their starting material for the ion-conducting separator/solid electrolyte, previously-prepared glassy powders with the composition of the intended amorphous electrolyte.

FIGS. 5 and 6 detail continuous processes for preparing continuous lengths of fiber-reinforced thin glass films. These films may subsequently be cut or otherwise fragmented into a plurality of discrete fiber-reinforced separator/solid electrolyte sheets suitably sized for the electro-chemical cell, for example that shown in FIG. 4, in which they are to be incorporated. However, those of skill in the art will appreciate that such a continuous process may readily be adapted to be conducted as a batch process, in which the individual steps may be conducted independently of one another and/or asynchronously to prepare a plurality of individual conductor sheets, not necessarily pre-sized for the electrochemical cell. For example, the processing steps may be performed at a series of individual stations with the in-process conductor sheets transported from station-to-station by pick-and-place automation, robots, conveyor belts or other suitable equipment.

In the embodiment shown in FIG. 5, the fiber reinforced thin glassy films are fabricated on a substrate, a portion 110 of which is shown. Substrate portion 110 is carried on, and advances in, the direction of arrow 130 by the action of rollers 112, 112'. Substrate portion 110 may be a portion of a continuous belt which, at roller 112' loops under (not shown) substrate portion 110 and is carried in a direction opposite that of arrow 130 from roller 112' to roller 112 until it loops upwardly (not shown) at roller 112 to again participate in the process to be described. Alternatively, substrate 110 may be a portion of a large diameter annular disc which is supported and carried on radially oriented rollers 112 continually advancing in a single direction until a surface portion of substrate 110 completes a full revolution and returns to its starting point ready for re-use. It will be further appreciated that, in operation of such a continuous device there may be need for cleaning or surface treatment stations (not shown) to restore the substrate surface to a suitable condition for re-use. These features and characteristics are not illustrated and the following description will focus primarily on the sequence of fabrication steps occurring in fabrication zone 200 on substrate portion 110 as substrate portion 110 traverses the fabrication zone.

Substrate portion 110, with a smooth surface 118, is advanced by support rollers 112, 112' in the direction of arrow 130 so that it is progressively carried into fabrication zone 200. As will be described more fully below, the material of substrate portion 110 is subjected to a range of temperatures that generally do not exceed 350° C. Accordingly, a wide range of materials may be considered for use as a substrate. Generally, the choice of substrate material should be informed by the requirement that it exhibit suitable structural strength at the maximum temperature of interest, and that it be non-reactive with the sulfide/oxysulfide glass powder. Exemplary materials include quartz, stainless steels, and a wide range of metals and alloys generally. In some applications, it may be feasible to use a high temperature, possibly reinforced polymer such as polytetrafluoroethylene (Teflon) or polyetheretherketone (PEEK).

As substrate portion 110 advances, it passes below hopper 122 containing particles of solid glassy materials 140 premixed with chopped reinforcing fibers 14 and dispensing nozzle 116, both of which cooperate to apply, by gravity, glass powder 140 and its associated reinforcing fibers 14, as a substantially uniformly thick powder layer 120, to the surface 118 of substrate portion 110. Although a single hopper 122 and nozzle 116 are shown, it may be appropriate to employ multiple dispensing nozzles 116, fed by a single or multiple hoppers 122 to more uniformly apply powder layer 120 to the full width of substrate portion 110. Those of skill in the art will appreciate that various additional pieces of conventional equipment such as screw conveyers, vibratory screens etc. (not shown) may be employed to assure a uniform and continuous flow of such particulate matter.

Similarly, to achieve a generally uniform distribution and thickness of the powder particles on substrate portion 110 a device such as a doctor blade (not shown) or a vibratory exciter (not shown) may be used to more completely level the applied powder and render a generally uniform powder layer 120 downstream of hopper 122. Although not shown, it will be appreciated that the powder and reinforcing fibers may also be applied as a paste containing a volatile solvent that may be evaporated after deposition, by electrostatic deposition or any other suitable means known to those of skill in the art.

Suitable solid glassy particles of the separator/solid composition may be formed, for example by ball milling a bulk, solid glassy material. Bulk glassy material may be prepared by any suitable method. The separator/solid composition powder preferably includes particles from a large number of size ranges to enable more complete packing of the power particles but the maximum particle size should be limited to no more than 15% of the thickness of powder layer 120.

It is intended that powder layer 120 be compacted and heated to form fully dense glassy layer 120'. Compaction and heating may be effected by passing powder layer 120 between opposed, heated rollers 142. In an aspect, powder layer 120 may optionally be preheated in an oven or furnace 134 (shown in ghost), or, rollers 142 may serve to both compact and heat the particles. For simplicity, only one set of rollers 142 is illustrated but a series of such heated rollers, each applying a predetermined degree of compaction until full or near-full density is achieved, may be employed. Of course, full density is most readily achieved when the packing fraction of powder layer 120 is highest, which, as noted, is promoted by accepting a wide range of a particle sizes, including fines, in separator/solid composition powder 140. The term full density is intended to encompass a compacted body containing less than 10% residual porosity.

Suitable time-temperature-pressure combinations to achieve full density are related to the viscosity of the glass composition which must be sufficiently low that the glassy particles will flow under pressure, rather than fracturing. Hence, the glass be maintained above its $T_g$, its glass transition temperature. However, the temperature should be selected to minimize any impact on the reinforcing fibers. High temperature fibers such as silica-based glass will impose no limits on the processing temperature, but, for thermoplastic polymer reinforcements, the processing temperature should be maintained at least below the glass transition temperature of the thermoplastic reinforcement. The compaction temperature may not exceed $T_c$, the crystallization temperature of the selected glass composition. Also, for production efficiency, the compaction time, or the time spent by powder layer 120 between the gap of rolls 142 cannot be excessive. Suitably the compaction temperature should be selected to be above $T_g$ but about 10-50° C. below $T_c$ both of which temperatures will vary with glass composition. Glasses compacted in this temperature range may be compacted in about 5-3600 seconds under a pressure of 0.1 to 360 MPa. By way of illustration and not limitation, some suitable oxy-sulfide glass compositions include $xLi_2S.(100-$ x−y)P$_2$S$_5$.yP$_2$O$_5$(x=50-90 and y=0-20) and which exhibit a T$_g$ of between 210° C. and 220° C. and a T$_c$ of between 220° C. and 280° C.

In the case of a thermoplastic fiber, the combination of heat and pressure may be expected to result in some fiber deformation, even when there is an appreciable difference in the glass transition temperature of the glassy powder composition and the glass transition temperature of the reinforcing fiber. Such fiber deformation, which might involve bulk deformation causing the fiber to adopt an other-than-straight configuration such as is shown in FIG. 1, or roughen the fiber surface by impressing glassy particles into the fiber in the early stages of the compaction process, may improve the mechanical interaction between the fiber and the glassy phase. Any such enhanced mechanical interaction will increase the effectiveness of the reinforcement in enhancing the fracture toughness of a fiber-reinforced separator/solid electrolyte.

Man-made inorganic fibers such as silica-based glass, which tend to have smooth fiber surfaces and which, because of their relatively high T$_g$, may not deform during separator/solid electrolyte processing, may be roughened prior to use to enhance their mechanical engagement with the separator/solid electrolyte composition. Suitable methods for surface roughening may include chemical etching, laser ablation, ion etching etc. Naturally-occurring minerals such as naturally exfoliated clays or mica will generally have sufficiently irregular surfaces to mechanically engage the separator/solid electrolyte without additional surface treatment.

After compaction, compacted fiber-reinforced glassy layer 120' will exhibit internal stress(es) which, if not relieved may promote spontaneous fracture and fragmentation of the glassy sheet. To relieve the resulting internal stress, compacted fiber-reinforced glassy layer 120' passes through annealing furnace 128. The annealing time and temperature may be selected to relieve internal stresses while retaining either an amorphous microstructure or a partially crystallized microstructure. When a fully amorphous or glassy fiber-reinforced layer is desired, the annealing temperature should be maintained above T$_g$ but below T$_c$ to render a glassy layer 120" substantially free of internal stresses. As long as the temperature is less than T$_c$ the annealing time may be selected consistent with the annealing temperature, with shorter annealing times being appropriate for higher annealing temperatures and longer annealing times being required for lower annealing temperature, as is well known to those of skill in the art.

In some aspects, it may be preferred that the microstructure in the fiber-reinforced glass layer 120" be partially crystalline. A partially crystalline microstructure comprising isolated, discontinuous nanometer-sized or micrometer-sized crystalline regions surrounded by amorphous material has been demonstrated to exhibit higher ionic conductivity and better resistance to penetration than a like-dimensioned fully amorphous body. The requirement that the crystalline phase be discontinuous limits the maximum fraction, by volume, of crystalline phase to be less than 60% with volumes as low as 1% being feasibly achieved. In a preferred aspect, the volume fraction of crystalline material should range from 20% to 40% for the sulfide and oxysulfide systems. The development of such a microstructure requires that the annealing temperature be increased to above T$_c$ for at least a brief period. Such a process might require the use of a second furnace (not shown) or, optionally, a multi(temperature)-zone furnace 128 may be employed.

On exiting the furnace 128 the fiber-reinforced glassy film 120" is allowed to slowly cool by radiation (shown as 132) before being separated from substrate 110.

FIG. 6 illustrates a process for fabricating such a fiber-reinforced glassy film in which the reinforcement is a mat. Similar considerations apply and the overall structure of fabrication zone 200' is largely unchanged. However, hopper 122 now contains only the amorphous glassy powder 140 and the fiber mat reinforcement (14' if unwoven, 27 if woven) is fed, as needed, from roll 150 to match the progress of moving substrate 110 so that fiber-reinforced glassy film 120" incorporates the fiber mat reinforcement.

Figure 7:
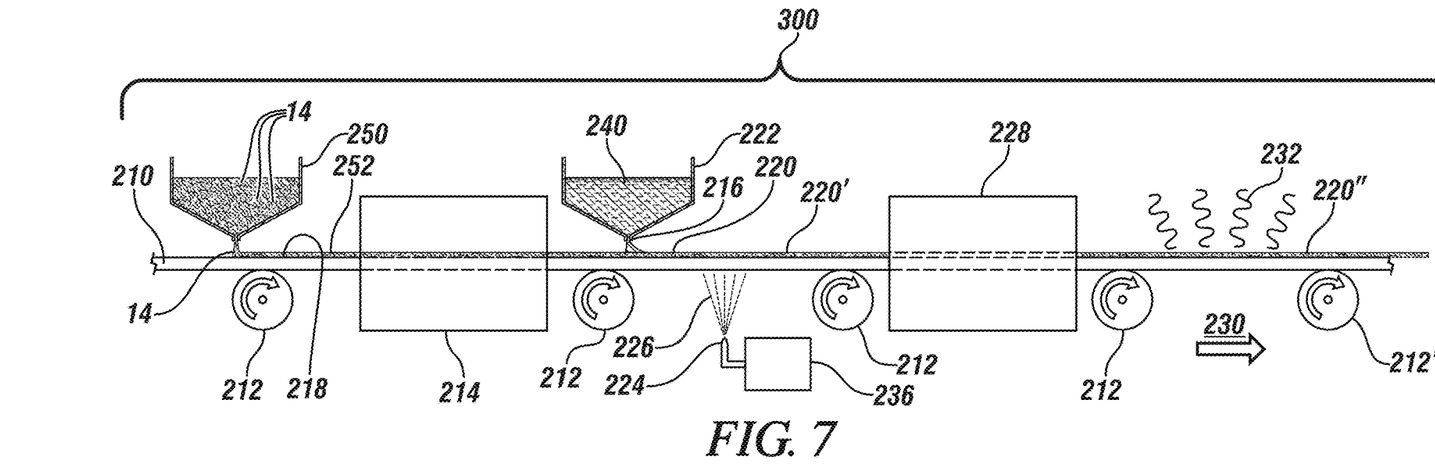
FIG. 7 illustrates a method of forming a separator/solid electrolyte incorporating chopped fibers from a melt of the ion-conducting composition.
Figure 8:
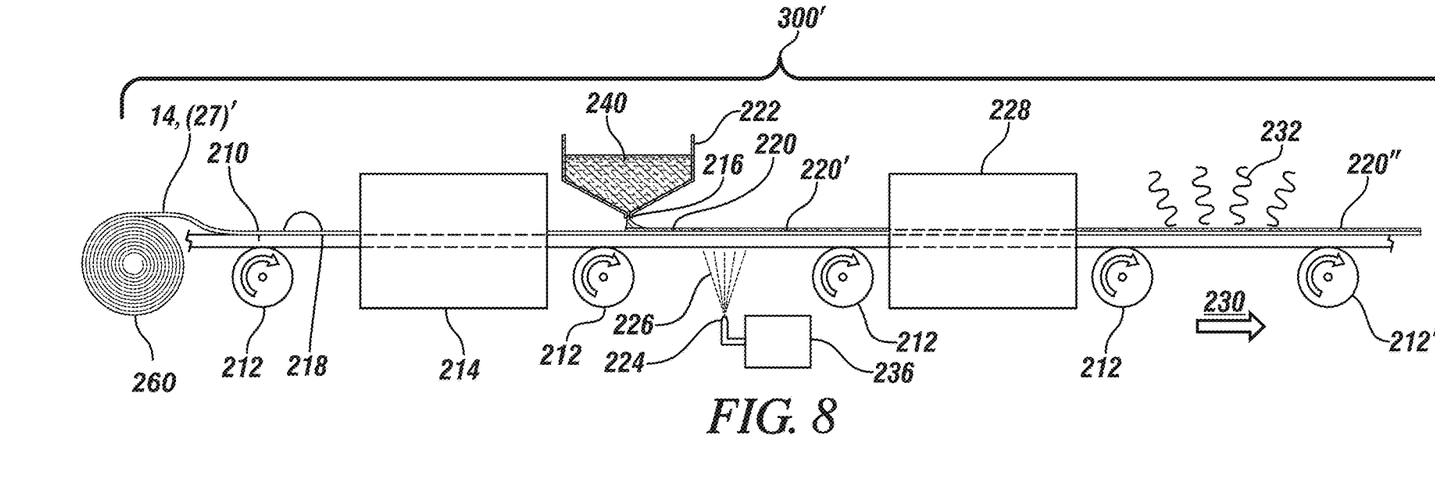
FIG. 8 illustrates a method of forming a separator/solid electrolyte incorporating a preformed mat from a melt of the ion-conducting composition

Alternative methods of fabricating a fiber-reinforced separator, applicable to a melt-processed separator such as the crystalline LiBH$_4$.LiNH$_2$ composition are shown at FIGS. 7 and 8 which show processes applicable to discrete fiber reinforcements (FIG. 7) and mat reinforcements, woven and unwoven (FIG. 8).

Analogously to the powder compaction process shown at FIG. 5, the process shown at FIG. 7 illustrates a fabrication zone 300 through which passes a substrate portion 210 transported on rollers 212, 212' in a direction indicated by arrow 230. As before, substrate portion 210 may be a portion of a continuous belt which, at roller 212' loops under (not shown) the section shown and is carried in the direction from roller 212' to roller 212 until it loops upwardly (not shown) at roller 212 to again participate in the process. Alternatively, substrate 210 may be a portion of a large diameter annular disc which is supported and carried on radially oriented rollers 212 continually advancing in a single direction until a surface portion of substrate 210 completes a full revolution and returns to its starting point ready for re-use. Again, in operation of such a continuous device there may be need for cleaning or surface treatment stations (not shown) to restore the substrate surface to a suitable condition for re-use.

Substrate portion 210 may be fabricated from a material which may be wetted by a melt, including a complex hydride melt, without reacting or otherwise interacting with the melt. Since the melting point of typical glass compositions may range to about 700° C., only a limited number of suitable substrate materials may be used. Preferably substrate surface 218 is fabricated of quartz. If substrate portion 210 is a section of a belt as described above it cannot be fabricated of a continuous sheet of brittle quartz but must instead be fabricated of a series of pivotably attached plates arranged to flex and bend in a manner generally analogous to a tank tread or caterpillar track. In this arrangement, it may be more convenient to use metal 'plates' to form the 'tread' or 'track' with each 'tread' or 'track' carrying an individual, smooth-bottomed, flat-bottomed, shallow quartz dish rather than trying to achieve a smooth continuous quartz surface.

Initially reinforcing fibers 14 are deposited on substrate portion 210 in a quantity and distribution sufficient to provide the intended reinforcement. Fibers 14 may be contained in one or more hoppers 250 and deposited by gravity or other suitable means including the use of screw conveyers, vibratory screens etc. (not shown) to assure a uniform and continuous flow of such particulate matter. Similarly, to achieve a generally uniform distribution and thickness of the reinforcing fibers 14 on substrate portion 210 a device such as a doctor blade (not shown) or a vibratory exciter (not shown) may be used to more completely level the applied powder and render a uniform fiber reinforcement thickness. Suitably, the thickness of the reinforcing fiber layer 252 is maintained at appreciably less than 200 micrometers and preferably appreciably less than 100 micrometers so that, when infiltrated with an ion-conducting composition, the reinforced separator/conductor may be maintained at a thickness of less than 200 micrometers.

Substrate portion 210, on entering fabrication zone 300 first enters a heating zone 214 which may comprise a furnace or other heating device adapted to heat the substrate and its reinforcing fibers to a temperature at or slightly above the melt temperature of the ion-conducting melt. Typically, this may range from 100° C. to 300° C. On continued advance of substrate portion 210 it receives, from dispensing device 222 through nozzle 216, a flow of the liquid melt 240. Although only a single dispenser 222 and nozzle 216 are shown, it may be appropriate to employ multiple nozzles 216 fed by a single dispenser 222 or to employ a plurality of nozzles 216 each fed by a dedicated dispenser 222 to more uniformly coat the substrate surface 218. Because the melt compositions may be reactive and volatile the liquid should be maintained under a 0.1-1 MPa overpressure of non-reactive gas such as argon such the that partial equilibrium vapor pressures of the more volatile species in the glass melt are less than the over pressure provided to minimize contamination and loss of glass-forming components and achieve consistency of composition. It may be appropriate to at least partially enclose (enclosure, or the like, not shown) that portion of the process involving liquid melt to facilitate atmosphere control. To limit the extent of, or need for, such atmosphere control, dispenser nozzle 216 should be positioned as close as possible to substrate surface 218, and coolant spray nozzle 224, which serves to cool and solidify the melt (described further below), should be placed as close as possible to where the melt is dispensed from nozzle 216.

In an aspect (not shown), fibers 14 may be incorporated in liquid melt 240 in dispenser 222 so that the reinforcements and liquid melt may be dispensed and laid down on substrate 210 together eliminating the need for a separate fiber dispenser 250. Such a practice will increase the effective melt viscosity and so may be limited to embodiments employing lower weight percentages of reinforcements. Stirring of the liquid melt to overcome the density differences between the reinforcements and the melt and maintain a generally uniform dispersion of reinforcements in the dispensed liquid may also be required.

Because the melt wets the substrate portion surface 118 the melt spreads over substrate surface 218 and infiltrates the fiber reinforcement layer 252 to produce a thin, substantially uniform, layer of melt 220 incorporating reinforcements 14 supported by substrate 210. The melt temperature may be informed by a requirement for a preferred fluidity range, generally a range which promotes the rapid distribution and levelling of the melt and enables rapid infiltration of the reinforcement layer 252 by the melt. The thickness of the melt may be adjusted by adjusting the volume flow rate of melt onto the substrate. Generally, it is preferred that the melt thickness be sufficient to cover the reinforcements 14 of reinforcement layer 252 Suitable melt thicknesses may range from 20 micrometers to 200 micrometers depending, in part, on the thickness of the reinforcement.

Further advance of substrate portion 210 will expose the underside of substrate portion 210 to coolant 226 applied through spray nozzle 224. Coolant 226, which, before dispensing, may be passed through a cooler (not shown) to increase its effectiveness, may be drawn from storage unit 234 as shown, or from some other suitable source, including a municipal water supply. Coolant 226 is applied at a flow rate sufficient to rapidly extract heat locally from substrate portion 210 so that liquid melt 220 is cooled by conduction through its contact with substrate portion 210 at a rate sufficient to suppress crystallization and render a solid layer 220' incorporating fiber reinforcements 14.

The aggressive cooling applied to liquid melt 220 may result in non-uniform cooling of liquid melt 220 and possibly induce residual stresses in solid layer 220'. Residual stresses may also be induced by differences in the thermal expansion coefficient of the layer 220' and the supporting quartz substrate portion 210. Thus, continued advance of substrate portion 210 carries the substrate portion and its supported solid glass layer 220' into a furnace, oven or other suitable heating device 228 where layer 120' may be raised to an elevated temperature for a time suitable to relax and relieve the residual stresses to render a substantially stress-free fiber-reinforced layer 220" at the furnace 228 exit.

The temperature of the furnace 228 and the annealing temperature to which layer 220' is subjected should be sufficiently high to promote stress relaxation in a reasonable time. A suitable annealing temperature will depend on the ion-conducting composition, but, by way of illustration and not limitation, an annealing temperature of between about 60° C. and 80° C. may be appropriate for a complex hydride ceramic.

On exiting the annealing furnace 228 the layer 220" slowly cools, by radiation as indicated at 232, to room temperature or about 20-25° C. At this stage, the layer may be removed from the substrate and processed appropriately to prepare it for use in an electrochemical cell. Since, as noted earlier, the substrate surface 218 is particularly selected not to react with the melt it is expected that no appreciable deformation of the layer or damage to the substrate surface 218 will occur on separation and that substrate portion surface 218 will, possibly absent some minor cleaning etc., be immediately available for re-use.

FIG. 8 illustrates a process for fabricating such a fiber-reinforced film in which the reinforcement is a mat. Similar considerations apply and the overall structure of fabrication zone is basically unchanged. However, hopper 250 is replaced by a roll 260 of mat reinforcement 14' (if non-woven) or 27 (if woven) which may be dispensed from roll 260 at a rate compatible with the rate of advance of substrate portion 210. The reinforcement (14' if unwoven, 27 if woven) is infiltrated by liquid melt 240 dispensed as before and processed analogously so that fiber-reinforced film 220" incorporates the mat reinforcement.

Figure 9:
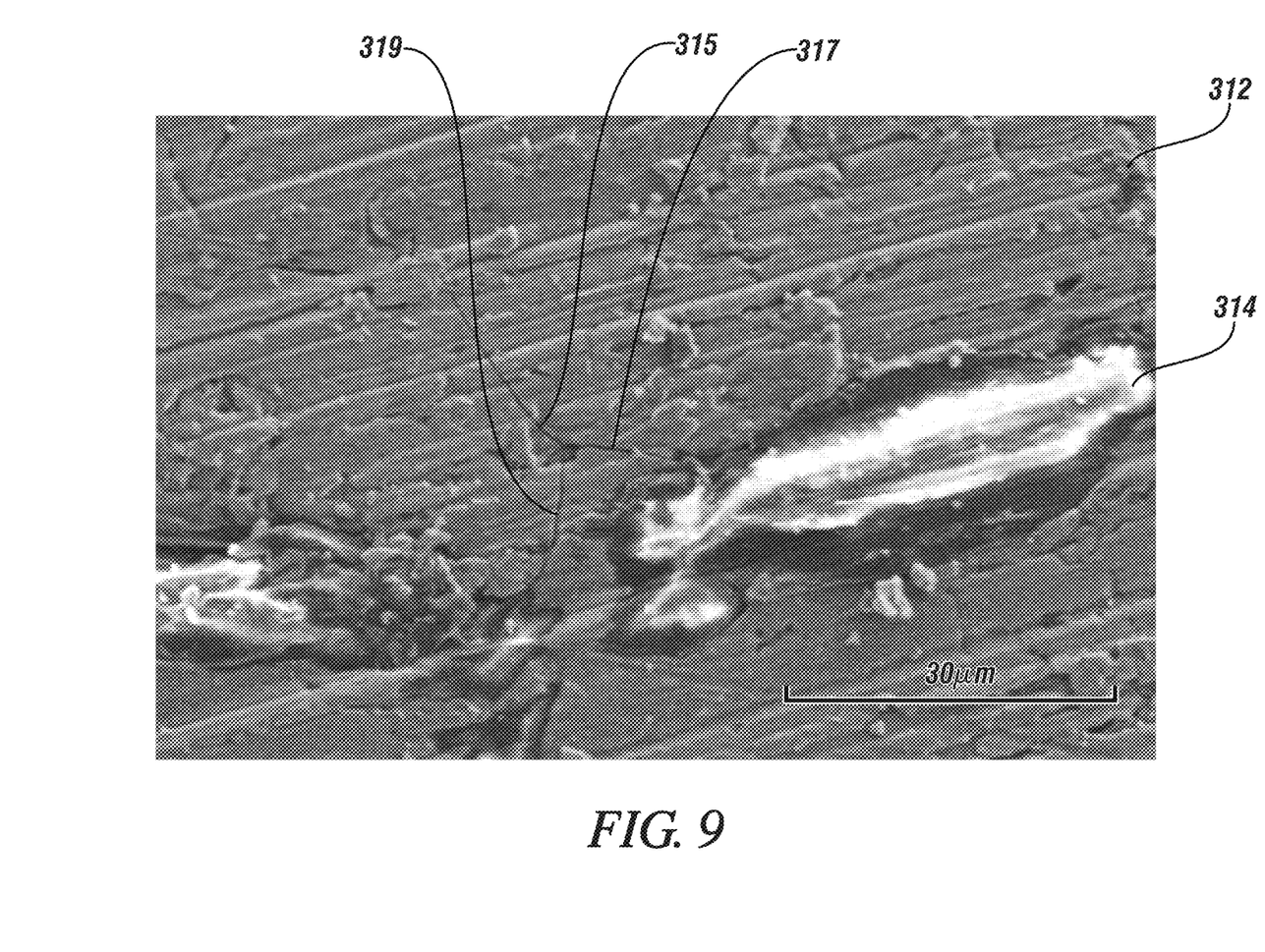
FIG. 9 is a scanning electron micrograph of a fiber-reinforced separator/solid electrolyte showing microcracks terminating at the reinforcing fibers after the separator/solid electrolyte has been subjected to a load sufficient to induce cracking in an unreinforced separator/solid electrolyte.

The effectiveness of fiber reinforcement in improving the fracture toughness and resistance to fracture of the separator/solid electrolyte may be appreciated by inspection of FIG. 9. FIG. 9 shows a scanning electron micrograph of a fiber-reinforced separator/solid electrolyte which has been subjected to a load representative of a load which may be applied during cell fabrication. Specifically FIG. 9 shows a scanning electron micrograph of a $70Li_2S.30P_2S_5$ separator/solid electrolyte reinforced with 10 wt. % of Kevlar® fiber pulp.

The fibers and powder were mixed using hexane as a dispersant. The hexane was then evaporated and the dispersed fiber and powder were cold pressed at a pressure of 150 MPa before being hot pressed, again at 150-370 MPa at a temperature of 220-230° C. The reinforced separator/solid electrolyte was then loaded in compression at applied stress of 300 MPa, a pressure which may be applied during battery fabrication to assure good anode to separator/solid electrolyte contact. As may be seen at FIG. 7 three cracks 315, 317, 319 are radiating outwardly from a location (presumed to be a pre-existing flaw) in the $70Li_2S.30P_2S_5$ glassy phase 212, but neither of cracks 317 and 319 extends beyond its intersection with Kevlar® reinforcing fiber 314. Crack 315 does not propagate extensively either and it is believed that it also was stopped by a Kevlar® fiber, but a fiber which lies out of the plane of section of the micrograph. The effectiveness of the fiber reinforcements in enhancing the fracture toughness of the separator/solid electrolyte was confirmed by conducting a like series of fabrication and testing steps on the same $70Li_2S.30P_2S_5$ glassy phase containing no reinforcement or only 1% by weight of Kevlar® fiber reinforcement. These samples fragmented. However, more that 3% by weight of Kevlar fibers was observed to be effective in preventing such gross cracking and fracture.

Significantly, the ionic conductivity of the $70Li_2S.30P_2S_5$—10 wt. % Kevlar® separator/solid electrolyte was 2.4 mS/cm versus an ionic conductivity of 4.03 mS/cm for $70Li_2S.30P_2S_5$ alone. The minimal reduction in ionic conductivity results, in part, from the high degree of densification achieved. In this example a near-theoretical density of 98% was achieved where theoretical density is the density of a void-free body of a like reinforced separator/solid electrolyte composition. Additional ionic conductivity benefit resulted from the relative rigidity of the reinforcements which enabled the separator/solid electrolyte composition to flow around the reinforcement to render a continuous phase and thus render a continuous path for conduction of ions. Of course, these and other comparably high separator/solid electrolyte densities are also effective in resisting dendrite penetration. More generally the ionic conductivity of a fiber-reinforced separator/solid electrolyte may be more than 10% of the ionic conductivity of a reinforcement-free separator/solid electrolyte of like composition prepared in a similar manner, for example, by densification of a powder compact as described above.

Such a dense, fiber-reinforced separator/solid electrolyte, at a thickness of about 100 micrometers or less, has a conductivity comparable to the ionic conductivity of a commercial polypropylene/polyethylene separator infiltrated with a liquid carbonate-based electrolyte employed in a liquid electrolyte lithium-ion cell. Thus, the benefit of enhanced fracture toughness of the separator/solid electrolyte may be obtained without significant loss of ionic conductivity. Thus, a lithium metal cell incorporating such a fiber-reinforced separator/solid electrolyte may be expected to perform comparably to a liquid electrolyte, lithium chemistry, electrochemical cells. Such a separator/solid electrolyte, if employed in a lithium-ion cell, would thus be expected to result in a lithium-ion cell whose electrical performance was indistinguishable from the electrical performance of a conventional, liquid electrolyte lithium-ion cell while conferring enhanced resistance to dendrite penetration.

In a second example, fiber-reinforced separator/solid electrolyte with ion-conducting composition $60Li_2S.28SiS_2.12P_2S_5$ and reinforced with 10 wt. % Kevlar® fiber pulp was prepared and evaluated using the same methods and processes described above. This ion-conducting composition has a modestly higher $T_g$ (about 250° C.) than the $T_g$ of the $70Li_2S.30P_2S_5$ composition (about 220° C.) but Kevlar remains a compatible thermoplastic reinforcement. Again, the fiber reinforced $60Li_2S.28SiS_2.12P_2S_5$—based separator/solid electrolyte exhibited markedly improved fracture toughness over the unreinforced composition and acceptable, though reduced (relative to the $70Li_2S.30P_2S_5$—based example), ionic conductivity of 0.4 mS/cm.

The above detailed description and the associated drawings or figures are presented for illustration of suitable exemplary embodiments and not for limitation of the following claims.

The invention claimed is:

1. A separator/solid electrolyte for an electrochemical cell comprising an anode comprising an alkali metal, a cathode, and the separator/solid electrolyte in the form of a thin sheet, the separator/solid electrolyte sheet comprising electrically and ionically non-conducting, fiber reinforcements, distributed and embedded in a continuous ion-conducting matrix for conduction of cations of the alkali metal, at least a portion of the ion-conducting matrix being amorphous, the amorphous portion having a glass transition temperature, the separator/solid electrolyte sheet having a thickness and two opposing sheet faces, one of the sheet faces being adapted for face-to-face contact with the alkali metal anode and the opposing sheet face for face-to-face contact with the cathode of the electrochemical cell.

2. The separator/solid electrolyte of claim 1 in which the separator/solid electrolyte has a thickness of up to 200 micrometers.

3. The separator/solid electrolyte of claim 1 in which the ion-conducting matrix incorporates mobile alkali metal cations and is one of the group consisting of a sulfide glass, and an oxy-sulfide glass.

4. The separator/solid electrolyte of claim 1 in which the distributed fiber reinforcements are one of, a plurality of individual chopped fibers, a non-woven fiber mat, a woven fiber mat, or a plurality of generally uniformly-distributed particles with a plate-like geometry.

5. The separator/solid electrolyte of claim 3 in which the distributed fiber reinforcements are present in an amount ranging from 2 to 40 percent by weight, the percentage of distributed fiber reinforcements being selected to increase the fracture toughness of the separator/solid electrolyte while maintaining the ionic conductivity of the reinforced separator/solid electrolyte at more than 10% of the ionic conductivity of a reinforcement-free separator/solid electrolyte of like, ion-conducting composition.

6. The separator/solid electrolyte of claim 1 in which the alkali metal is lithium or sodium.

7. The separator/solid electrolyte of claim 4 in which the reinforcing fibers are silica-based glass fibers, alumina fibers, boron nitride fibers or thermoplastic polymer fibers.

8. The separator/solid electrolyte of claim 7 in which the thermoplastic polymer fibers have a glass transition temperature and the thermoplastic polymer fiber glass transition temperature is greater than the glass transition temperature of the amorphous portion of the ion-conducting matrix.

9. The separator/solid electrolyte of claim 1 in which the separator/solid electrolyte has a density of at least 90% of the theoretical density.

10. The separator/solid electrolyte of claim 1 in which the separator/solid electrolyte is less than 200 micrometers thick and the ion-conducting matrix has the composition $70Li_2S.30P_2S_5$ or $60Li_2S.28SiS_212P_2S_5$ and the ion-conducting matrix is reinforced with 10 wt. % of aramid fiber.

11. An electrochemical cell comprising an anode comprising an alkali metal, a cathode, and a separator/solid electrolyte in the form of a thin sheet, the separator/solid electrolyte sheet comprising electrically and ionically non-conducting, fiber reinforcements, distributed and imbedded in a continuous ion-conducting matrix for conduction of cations of the alkali metal, at least a portion of the ion-conducting matrix being amorphous, the separator/solid electrolyte sheet having a thickness and two opposing sheet faces, one of the sheet faces being in face-to-face contact with the alkali metal anode and the opposing sheet face being in face-to-face contact with the cathode of the electrochemical cell.

12. The electrochemical cell of claim 11 in which the alkali metal is lithium.

13. The electrochemical cell of claim 11 in which the ion-conducting matrix incorporates mobile alkali metal cations and is one of the group consisting of a sulfide glass, and an oxy-sulfide glass.

14. The electrochemical cell of claim 11 in which the distributed fiber reinforcements are one of, a plurality of individual chopped fibers, a non-woven fiber mat, a woven fiber mat, or a plurality of generally uniformly-distributed particles with a plate-like geometry.

15. The electrochemical cell of claim 11 in which the fiber reinforcements are present in an amount ranging from 2 to 40 percent by weight, the percentage of distributed reinforcements being selected to increase the fracture toughness of the separator/solid electrolyte while maintaining the ionic conductivity of the reinforced separator/solid electrolyte at more than 10% of the ionic conductivity of a reinforcement-free separator/solid electrolyte of like ion-conducting composition.

* * * * *